Patented Sept. 20, 1949

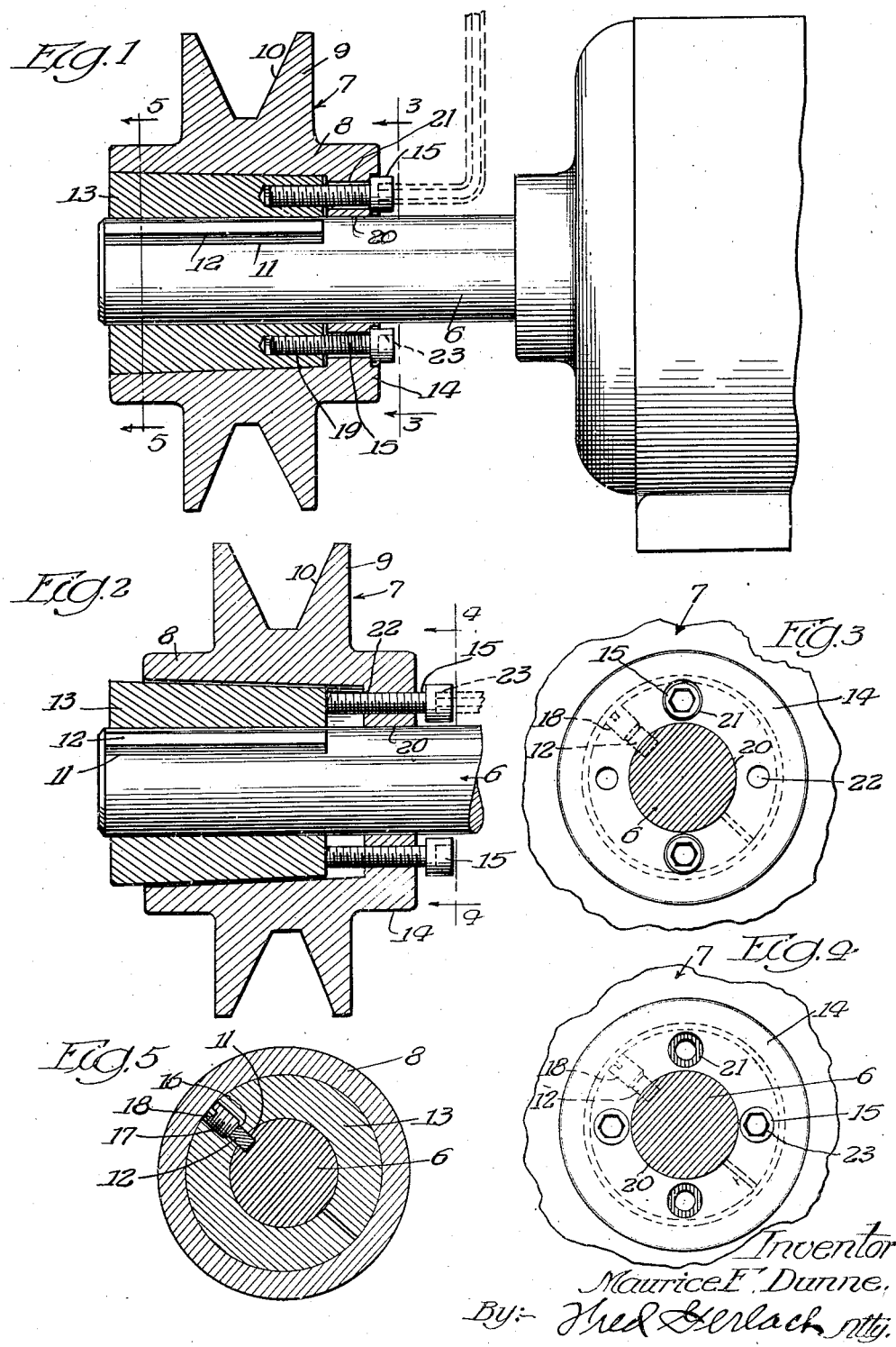

2,482,662

UNITED STATES PATENT OFFICE 2,482,662

SHAFT-PULLEY COUPLING OF THE LONGITUDINALLY SPLIT, TAPERED SLEEVE TYPE

Maurice F. Dunne, Chicago, Ill.

Application May 28, 1947, Serial No. 751,014

3 Claims. (Cl. 287—52.06)

1

The present invention relates generally to couplings. More particularly the invention relates to that type of coupling which is adapted to be interposed between a shaft and the hub of a pulley or like rotary part, serves when in its operative position to connect the shaft and pulley for conjoint rotation, and comprises in addition to a longitudinally split sleeve having a cylindrical shaft-engaging inner periphery and a uniformly tapered outer periphery for engagement with the inner periphery of the hub, means whereby the pulley hub may be selectively slid relatively to the sleeve either in the direction of the large end of the sleeve in order to effect contraction of the sleeve around the shaft and bring it into wedged or operative relation with the shaft and hub, or in the direction of the small end of the sleeve in order to release it from the sleeve and thus free the pulley so that it is out of driving relation with the shaft.

One object of the invention is to provide a coupling of this type which is an improvement upon, and has certain inherent advantages over, previously designed couplings and is characterized by the fact that the means for selectively sliding the pulley hub in either direction with respect to the sleeve is simple in design and construction and may be manipulated for hub sliding purposes with ease or facility.

Another object of the invention is to provide a shaft-pulley coupling of the type under consideration in which the small end of the sleeve is provided with a plurality of spaced apart longitudinally extending screw threaded holes, and the means for selectively sliding the pulley hub in either direction relatively to the sleeve consists of (1) an annular flange which is formed integrally with, and projects inwards from, one end of the pulley hub, is disposed adjacent and outwards of the small end of the sleeve, has a plurality of spaced apart, smooth bore, longitudinal holes corresponding in number to, and in alignment with, the screw threaded holes in the small end of the sleeve, and in addition has a plurality of spaced apart, longitudinally extending, screw threaded holes corresponding in number to the smooth bore holes and in offset relation with the latter; and (2) a plurality of cap screws which correspond in number to any one of the sets of holes and are adapted when inserted through the smooth bore holes in the flange and into the threaded relation with the screw threaded holes in the small end of the sleeve and then tightened, to slide or shift pulley hub towards the large end of the sleeve and thus render the

2 coupling operative and when inserted through the screw threaded holes in the flange and then tightened after abutment of their inner ends with the adjacent end face of the sleeve to slide or shift the pulley hub in the direction of the small end of the sleeve and thus render the coupling inoperative.

Another object of the invention is to provide a coupling of the last mentioned character in which the central hole in the annular flange is of substantially the same diameter as the shaft in order that the flange serves to hold the pulley in centered or concentric relation with the shaft in connection with sliding of the pulley hub relatively to the sleeve.

A further object of the invention is to provide a coupling of the type and character under consideration in which the longitudinally split sleeve is connected to the shaft by way of a longitudinally extending key and has a radially extending screw threaded hole which is in alignment and communication with the key, carries a set screw for holding the sleeve in place with respect to the key and is so positioned that the outer end thereof is covered when the coupling is in its operative position, i. e., when the pulley hub is slid by the cap screws towards the large end of the sleeve and into wedged or gripping relation with the sleeve.

A still further object of the invention is to provide a coupling of the character under consideration which is generally of new design and improved construction, effectively and efficiently fulfills its intended purpose and is so designed that it may be produced at a comparatively low cost.

Other objects of the invention and the various advantages and characteristics of the present coupling will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a view partly in longitudinal section and partly in side elevation, showing a coupling embodying the invention in its operative position with respect to a shaft and a pulley and illustrating the manner in which the cap screws, after being inserted through the smooth bore holes in the flange of the pulley hub and into threaded relation with the screw threaded holes in the small end of the sleeve and then tightened, serve to hold the coupling in such position;

Figure 2 is a similar view except that it shows the cap screws extending through the screw threaded holes in the flange on the pulley hub and illustrates the manner in which such screws operate when tightened to shift the pulley hub toward the small end of the sleeve into a released position with respect to the sleeve;

Figure 3 is a vertical transverse section on the line 3—3 of Figure 1;

Figure 4 is a vertical transverse section on the line 4—4 of Figure 2; and

Figure 5 is a vertical transverse section taken on the line 5—5 of Figure 1 and showing the arrangement and position of the radially extending screw threaded hole which has associated therewith the set screw for holding the longitudinally split sleeve in fixed relation with the key on the shaft.

The coupling which is shown in the drawing constitutes the preferred form or embodiment of the invention. It is illustrated in connection with a shaft 6 and a pulley 7 and serves, as described in detail hereafter, releasably to connect the shaft and pulley for conjoint rotation or drive. The shaft 6 is disclosed as being the armature shaft of an electric motor, although, so far as the present coupling is concerned, it may be any other shaft. The pulley 7 represents merely one type of a rotary part with which the coupling may be used. It is illustrated in the drawing as being of conventional construction and comprises a hub 8 and a body 9. The body of the pulley has an annular groove 10 for a belt (not shown). The hub 8 surrounds and is in concentric relation with the shaft 6 and has a uniformly tapered or frusto-conical inner periphery. The shaft 6 is cylindrical throughout the zone thereof that is surrounded by the pulley and has a longitudinal keyway 11. The inner portion of a key 12 is seated or disposed in this keyway. Preferably the keyway and key are polygonal in cross section. The diameter of the shaft 6 is less than the diameter of the small end of the tapered inner periphery of the pulley hub 8. As its component parts the coupling comprises a longitudinally split sleeve 13, an annular flange 14, and a plurality of cap screws 15. But two cap screws are illustrated in the drawing, although it is to be understood that more than two or one may be employed. For purposes of the present disclosure it will be understood that the coupling comprises two cap screws.

The sleeve 13 of the coupling has a cylindrical inner periphery and a uniformly tapered outer periphery. The split in the sleeve extends from one end of the sleeve to the other in order that the sleeve is contractable as well as expansible. As shown in the drawing, the sleeve is interposed between the shaft 6 and the hub of the pulley. When the sleeve is not contracted the diameter of its inner periphery is slightly greater than the diameter of the shaft. The angle of taper of the outer periphery of the sleeve is the same as that of the inner periphery of the hub of the pulley. Preferably the length of the sleeve is but slightly less than the length of the pulley hub 8. The sleeve has an internal, longitudinally extending, full length keyway 16 for the outer portion of the key 12. When the sleeve 13 is in its operative position the key forms a driving connection whereby the sleeve and shaft are keyed together for conjoint rotation. The keyway 16 is located diametrically opposite the longitudinal split in the sleeve 13. The sleeve 13 is provided with a radially extending screw threaded hole 17 for a set screw 18. The hole is in alignment and communication with the keyway 16 and has the outer end thereof in intersecting relation with the outer periphery of the sleeve. It is located inwards of the large end face of the sleeve to the end that when the coupling is in its operative position the outer end of the hole is covered or closed by the hub of the pulley. When tightened the set screw 18 abuts against the key 12 and serves fixedly to connect the sleeve to the shaft 6. It is of less length than the radially extending screw threaded hole 17 and has in the outer end thereof a kerf or socket whereby it may be turned by a suitable turning tool. The sleeve 13 when in its operative position is arranged so that the small end thereof faces or projects in the same direction as the small end of the uniformly tapered inner periphery of the hub 8 of the pulley. When the pulley hub is slid in the direction of the large end of the sleeve as shown in Figure 1 of the drawing, it contracts the sleeve around the shaft and is brought into such wedged or gripping relation with the sleeve that the pulley is in fixed or driving relation with the sleeve. When the pulley is slid in the opposite direction, i. e., in the direction of the small end of the sleeve, the hub thereof moves out of gripping or wedged relation with the sleeve and hence releases the pulley so that it is free with respect to the shaft. The small end of the sleeve 13 is provided with two diametrically opposite, longitudinally extending, screw threaded holes 19 for the shanks of the cap screws 15. The outer ends of the holes intersect or open onto the small end face of the sleeve and the inner ends of the holes terminate adjacent the central portion of the sleeve.

The annular flange 14 is formed integrally with, and projects inwards from, the hub 8 of the pulley 7 and is disposed adjacent the small end of the sleeve 13. It has a central circular hole 20 and this is substantially the same in diameter as the shaft 6. By reason of the fact that the hole 20 is the same in diameter as the shaft the flange 14 serves when the pulley is mounted on the shaft to hold it in centered or concentric relation with the shaft while at the same time permitting the pulley to slide lengthwise of the shaft. The flange 14 is provided with a pair of diametrically opposite, longitudinally extending, smooth bore holes 21 and a pair of diametrically opposite, longitudinally extending, screw threaded holes 22. The holes 22 extend completely through the flange and have enlarged outer ends for receiving the heads of the cap screws 15. They are of slightly greater diameter than the shanks of the cap screws and are adapted when the pulley 7 is in proper position with the sleeve 13, to be aligned with the screw threaded holes 19 in the small end of the sleeve. The threaded holes in the flange 14, i. e., the holes 22, are disposed at right angles to the smooth bore holes 21 and are the same in diameter as, and screw threaded similarly to, the holes 19 in the small end of the sleeve 13. As shown in the drawing, the holes 22 extend completely through the flange 14.

The cap screws 15 are of standard or conventional construction and consist of externally threaded shanks and enlarged heads on certain ends of the shanks. The heads have polygonal sockets 23 whereby the cap screws may be turned by way of a wrench (see dotted lines in Figure 1) of the type that comprises an L-shaped polygonal rod. The cap screws are adapted selectively to be inserted through the smooth bore holes 21 and the screw threaded holes 22. When the cap screws, as best shown in Figure 1, are inserted through the smooth bore holes 21 and into the screw threaded holes 19 in the small end of the sleeve and then tightened they serve to slide the pulley in the direction of the large end of the sleeve and thus bring the pulley hub into wedged relation with the sleeve to the end that the pulley and shaft are connected together for the conjoint drive or rotation. When it is desired to release the pulley by shifting it in the direction of the small end of the sleeve the cap screws are withdrawn from the holes 19 and 21 and are inserted through the screw threaded holes 22 in the flange 14. When the cap screws, after being inserted through the holes 22 and brought into abutment with the small end face of the sleeve as shown in Figure 2, are tightened they operate to shift or slide the pulley in the direction of the small end of the sleeve and thus free the pulley from driving relation with the shaft. When the coupling is in its operative position wherein the hub of the pulley is shifted as far as possible in the direction of the large end of the sleeve the sleeve is confined entirely within the inner periphery of the hub and the hub covers or encloses the outer end of the radially extending screw threaded hole 17 and thus in the event of loosening of the set screw 18 prevents loss of the set screw.

The herein described coupling effectively and efficiently fulfills its intended purpose and, due to its specific design or construction, may be produced at a comparatively low cost. It may be manipulated into and out of its operative position with facility and is characterized by the fact that the annular flange 14 has a twofold purpose in that it serves not only as a medium for carrying the cap screws 15 but also to maintain the pulley 7 in centered or concentric relation with the shaft 6. The coupling is also characterized by the fact that the key engaging set screw for securing the sleeve in fixed relation with the shaft is covered by the hub of the pulley when the coupling is in its operative position.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a coupling adapted for use in connection with a shaft and a part with a hub extending concentrically around the shaft and having the inner periphery thereof spaced from the shaft and tapered, said coupling comprising a longitudinally split one-piece sleeve extending around the shaft and within the hub, having a shaft engaging inner periphery and its outer periphery tapered in conformity with the inner periphery of the hub, adapted when the hub is shifted toward the large end of the sleeve to be brought into wedged and gripping relation with the hub and when the hub is shifted toward the small end of the sleeve to release the hub and free the part with respect to the shaft, and provided in its small end with a longitudinal screw threaded hole, an annular flange connected fixedly to, and projecting inwards from, the end of the hub that is adjacent the small end of the sleeve, having the inner periphery thereof in direct sliding engagement with the shaft in order that it serves to hold the part in concentric relation with the shaft, and provided with a smooth bore longitudinal hole in alignment with, and of greater diameter than, the screw threaded hole in said small end of the sleeve and in addition a longitudinal screw threaded hole in offset relation with the smooth bore hole and in alignment with the small end of the sleeve, and a cap screw adapted when inserted through the smooth bore hole in the flange and into screw threaded relation with the screw threaded hole in the small end of the sleeve and then tightened to shift the hub toward the large end of the sleeve and when inserted through the screw threaded hole in the flange and then tightened after abutment with the small end face of the sleeve to shift the hub in the direction of the small end of the sleeve.

2. As a new article of manufacture, a coupling adapted for use in connection with a shaft having a longitudinal external keyway and a key in the keyway, and a part with a hub extending concentrically around the shaft, and having the inner periphery thereof spaced from the shaft and tapered, said coupling comprising a longitudinally split one-piece sleeve extending around the shaft and within the hub, having a shaft engaging inner periphery and its outer periphery tapered in conformity with the inner periphery of the hub, embodying in its said inner periphery a longitudinal keyway for the key, adapted when the hub is shifted toward the large end of the sleeve to be brought into wedged and gripping relation with the hub and when the hub is shifted toward the small end of the sleeve to release the hub and free the part with respect to the shaft, having a radially extending, open ended screw threaded hole leading to its keyway, provided with a key engaging set screw and positioned so that it is covered by the hub when the latter is shifted so that the sleeve is in wedged and gripping relation therewith, and also having a longitudinal screw threaded hole in its small end, an annular flange formed integrally with, and projecting inwards from, the end of the hub that is adjacent the small end of the sleeve, provided with a smooth bore longitudinal hole in alignment with, and of greater diameter than, the screw threaded hole in said small end of the sleeve and in addition a longitudinal screw threaded hole in offset relation with the smooth bore hole and in alignment with the small end of the sleeve, and a cap screw adapted when inserted through the smooth bore hole in the flange and into screw threaded relation with the screw threaded hole in the small end of the sleeve and then tightened to shift the hub toward the large end of the sleeve and when inserted through the screw threaded hole in the flange and then tightened after abutment with the small end face of the sleeve to shift the hub in the direction of the small end of the sleeve.

3. As a new article of manufacture, a coupling adapted for use in connection with a shaft having a longitudinal external keyway and a key in the keyway, and a part with a hub extending concentrically around the shaft, and having the inner periphery thereof spaced from the shaft and tapered, said coupling comprising a longitudinally split sleeve of less length than the hub, extending around the shaft and within the hub, having a shaft engaging inner periphery and its outer periphery tapered in conformity with the inner periphery of the hub, embodying in its said inner periphery a longitudinal keyway for the key, adapted when the hub is shifted toward the large end of the sleeve to be brought into wedged and gripping relation with the hub and when the hub is shifted toward the small end of the sleeve to release the hub and free the part with respect to the shaft, having a radially extending, open end, screw threaded hole leading to its keyway, provided with a key engaging set screw and positioned so that it is covered by the hub when the latter is shifted so that the sleeve is in wedged and gripping relation therewith, and also having a longitudinal screw threaded hole in its small end, an annular flange connected to, and projecting inwards from, the end of the hub that is adjacent the small end of the sleeve, having the inner periphery thereof in direct sliding engagement with the shaft in order that it serves to hold the part in concentric relation with the shaft, and provided with a smooth bore longitudinal hole in alignment with, and of greater diameter than, the screw threaded hole in said small end of the sleeve and in addition a longitudinal screw threaded hole in offset relation with the smooth bore hole and in alignment with the small end of the sleeve, and a cap screw adapted when inserted through the smooth bore hole in the flange and into screw threaded relation with the screw threaded hole in the small end of the sleeve and then tightened to shift the hub toward the large end of the sleeve and when inserted through the screw threaded hole in the flange and then tightened after abutment with the small end face of the sleeve to shift the hub in the direction of the small end of the sleeve.

MAURICE F. DUNNE.

REFERENCES CITED

The following references are of record in the file of this patent:

UNITED STATES PATENTS

| Number | Name | Date |
|---|---|---|
| 2,322,832 | Davis | June 29, 1943 |
| Re. 22,485 | Otto | May 23, 1944 |

FOREIGN PATENTS

| Number | Country | Date |
|---|---|---|
| 510,852 | France | 1920 |